S. P. W. Douglass,
Motor.
N°2,104.    Patented May 22, 1841.
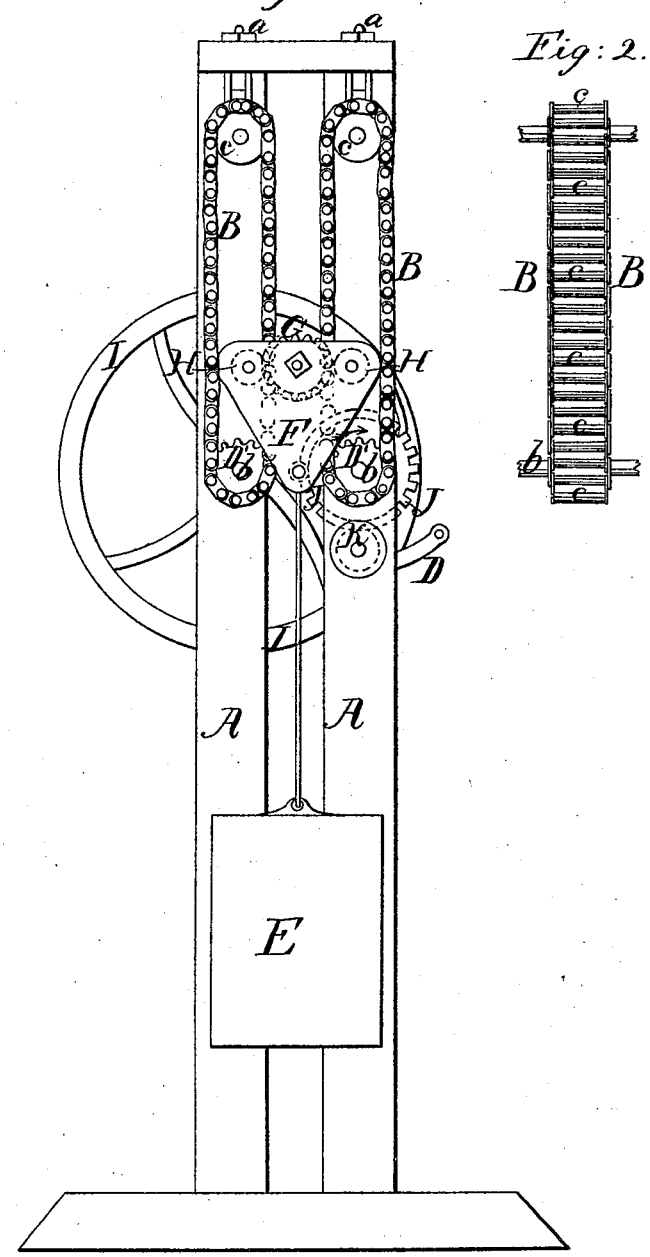

UNITED STATES PATENT OFFICE.

S. P. W. DOUGLASS, OF WILLIAMSON, NEW YORK.

MODE OF MAINTAINING POWER TO DRIVE MACHINERY.

Specification of Letters Patent No. 2,104, dated May 22, 1841.

*To all whom it may concern:*

Be it known that I, STEPHEN P. W. DOUGLASS, of Williamson, in the county of Wayne and State of New York, do hereby declare that the following is a full and exact description of a new and useful machine, which I denominate a "maintaining-power," and which is to be used in propelling or giving motion to machinery, and for which I am authorized to obtain Letters Patent of the United States in conformity with the provision of an act of Congress passed on March 3, 1839, entitled "An act for the relief of Stephen P. W. Douglass."

The object of my machine is to obtain a regular motive power for propelling machinery either from an irregular or intermitting power, or from a regular power which is inadequate to the production of the desired effect, and this I accomplish by causing such intermitting power, or inadequate power, to raise a heavy weight, under such an arrangement of the respective parts of my said machine, as shall cause the weight to operate upon any other machine which it is to propel with equal force at all times, whether said weight is in the act of being raised by an intermitting power applied to it, or of descending by its own gravity when such intermitting power ceases to act. The intermitting power employed may be of various kinds, such as that of the wind; the walking of animals in a wheel, or hollow drum; the ebbing and flowing of the tide, the expansion and contraction of metals by variations of temperature; the occasional winding up of the weight by manual labor; and, in fine, any intermitting motion which will admit of its being coupled to, or connected with, the machinery. The mode of coupling, connecting, or conveying such intermitting, or inadequate, power, will, of course, depend upon the nature of the power itself, and can be readily effected according to circumstances, by any competent machinist.

In the accompanying drawing A, A, are vertical timbers making a part of the frame of my machine, the front part of the frame corresponding with A, A, being omitted for the purpose of showing the construction of its principal working parts.

B, B', are two endless chains which pass around, and are supported by, the rollers C, C, at the upper end of the machine. The axes of these rollers run in bearings, which may be raised or lowered by means of the screw nuts $a, a$, so as to regulate the tension of the chains. At the lower ends of these chains they are made to pass around two toothed wheels, or pinions, D, D', the arbors, or shafts, $b, b'$, of which wheels or pinions have their bearings in the framework of the machine. The chains B, B', are in pairs, their links being connected together by rods, or rounds of metal, into which the leaves of the pinions D, D', are to gear. Figure 2 is a side view of one of these chains, or rather chain bands, $c, c$, being the rounds by which the chains are connected.

E, is the weight which is to be raised by the intermitting, or other power, and which, by its descent is to be made to propel machinery with regularity. This weight is suspended from the metallic frame F; which frame consists of two plates of metal, embracing the endless chains between them, and receiving the pivots or gudgeons, of a toothed wheel, or pinion G, and of two friction rollers H, H, shown by dotted lines. The teeth of the wheel G, gear, like those of D, D', with the rounds of the endless chains, the office of the friction rollers H, H, being to keep the said rounds in contact with the wheel G.

When the apparatus is thus constructed and arranged, if any power be applied to the wheel D', to cause it to revolve in the direction indicated by the arrow, this power will tend to raise the weight E, by the action of the chain B', on the wheel G; and if the power applied be greater than that which is expended in the moving of other machinery, the weight will actually be raised. The power which is to be applied to the propelling of other machinery, is communicated thereto through the intermedium of the arbor, or shaft $b$, of the wheel D; this arbor, or shaft being made to revolve by the descent of the weight E, as will be manifest from an inspection of the drawing.

I, I, represents a fly wheel which may be placed on any convenient part of the shaft $b$, and which should be used whenever the machinery to be propelled may require such a regulator.

J, is a toothed wheel on the arbor, or shaft of the wheel D. The dotted lines (K) represent a pinion engaging with this wheel, and which pinion may be turned by hand, by means of the winch L; the power, however as before remarked, must be communicated in such manner as may be required by its peculiar nature.

The conditions of the action of this machine, moved by an intermitting power, are, that the aggregate, or sum, of such intermitting power, shall be equivalent to that expended in the propelling of the machinery; but it will be manifest that this intermitting power may be continuously applied to the raising of the weight, while its expenditure, will in most cases, be required for a comparatively short period only. And my "maintaining power" as before remarked may be used, not only by the application of an intermitting motive power, but also by that of a continuous one, the force of which is inadequate to the propelling of the machinery excepting it be first accumulated; thus, for example, a small stream of water, affording but half the power required would, by its operation for two hours raise the weight to such a height as would enable it to give out the required force during the period of one hour.

Having thus fully explained the nature and operation of my motive power, what I claim therein as new, and desire to secure by Letters Patent, is—

The manner in which the two endless chains, are arranged, and connected and combined, with the respective wheels, or pinions D, D', and G, and with the weight to be raised, and with the machinery to be propelled, so as to obtain a regular propelling force, either from an intermitting motive power, or from a continuous inadequate power, as herein set forth; the whole being constructed and operating substantially as herein described.

STEPHEN P. W. DOUGLASS [L. S.]

Witnesses:
 DAVID LEIGHTON,
 WILLIAM DANFORTH.